(No Model.)
O. DILLMANN.
MANUFACTURE OF GLASS PAINTINGS.
No. 518,806. Patented Apr. 24, 1894.
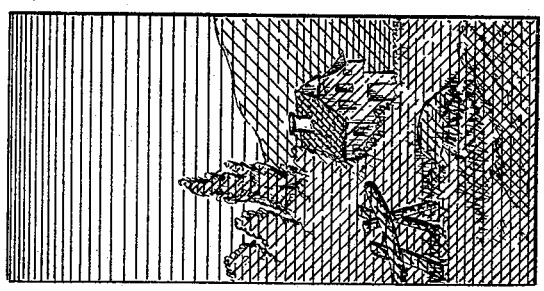
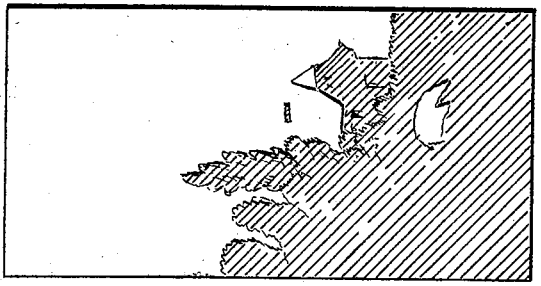
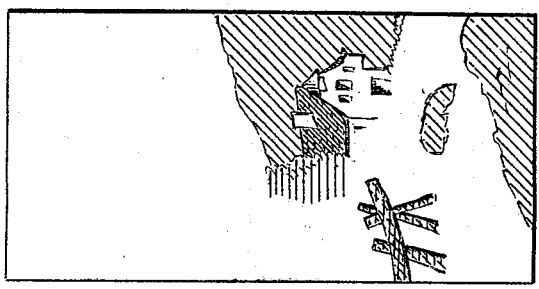
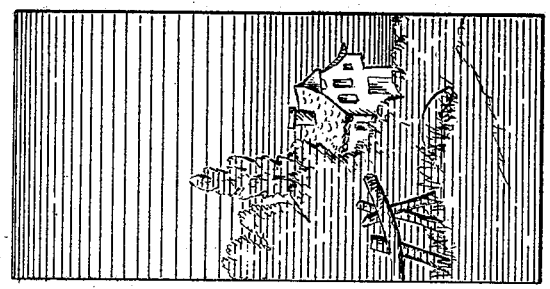
Witnesses:
M. C. Massie.
G. M. Lamasure
Inventor:
Otto Dillmann
by Mason Fenwick
his attys.
THE NATIONAL LITHOGRAPHING COMPANY,
WASHINGTON, D. C.

UNITED STATES PATENT OFFICE.

OTTO DILLMANN, OF MUNICH, GERMANY.

MANUFACTURE OF GLASS PAINTINGS.

SPECIFICATION forming part of Letters Patent No. 518,806, dated April 24, 1894.

Application filed August 29, 1893. Serial No. 484,320. (No specimens.) Patented in England June 26, 1890, No. 9,942; in Luxemburg July 14, 1890, No. 1,857; in Belgium July 15, 1890, No. 91,032; in Germany July 30, 1890, No. 57,870; in France October 20, 1890, No. 206,627, and in Austria-Hungary October 22, 1890, No. 28,823 and No. 48,984.

*To all whom it may concern:*

Be it known that I, OTTO DILLMANN, a subject of the King of Bavaria, and a resident of Munich, Bavaria, Germany, have invented certain new and useful Improvements in the Manufacture of Glass Paintings, (patented in Germany July 30, 1890, No. 57,870; in Belgium July 15, 1890, No. 91,032; in Austria-Hungary October 22, 1890, No. 28,823 and No. 48,984; in England June 26, 1890, No. 9,942; in France October 20, 1890, No. 206,627, and in Luxemburg July 14, 1890, No. 1,857,) of which the following is a specification.

My invention relates to improvements in the art of manufacturing stained glass, and to the product obtained thereby.

The object of my invention is to produce, in a simple manner, complicated glass paintings in which the various colors will blend one into the other, so that pictures on glass, made in accordance with my invention, will be natural in coloring.

My invention consists in coating separate or otherwise providing surfaces of glass and other transparent material with all those colors necessary to the production of the complete picture, each surface having only one color, which is applied alone to such parts of the surface as correspond to the location of the color or some combination of the color in the final picture, these separate surfaces being then stacked together. The result is that when seen by transmitted light, the picture exhibits the various colors and their various combinations in the proper locations to produce all the necessary effects.

In the drawings—Figures 1, 2 and 3 illustrate views of separate surfaces, to each of which a different color has been applied in the parts shown by the hatched lines, the various colors being indicated by the varying inclinations of the hatching lines. Fig. 4 is a view showing the three surfaces stacked together, the interlacing of the variously inclined hatching lines being intended to illustrate the manner in which the several colors on their separate surfaces will blend together. Fig. 5 is a cross section of Fig. 4.

A picture is produced by my process somewhat as in chromolithography, where each color is applied to the picture by a single impression, the complete picture being the result of a series of applications or impressions of different colors, the difference being that in my process, each color is applied to a separate transparent sheet or surface, and the complete picture developed by the combination of the various sheets or surfaces when seen by transmitted light. Of course, these various colors may be applied to their respective surfaces in any known way, as by staining, flashing, painting or otherwise. If, for example, one surface is stained or flashed in blue and then covered by a similar surface colored in yellow, the picture produced by the transmitted light will exhibit a blue color in those places where the lower plate is blue and the upper plate is colorless. Also, it will show a yellow color where the under surface is colorless and the upper one yellow, and it will show a green color in those places where the lower plate is blue and the upper one yellow. Moreover, by varying the tone of the colors on their respective surfaces, a graduation in tint of the final picture will be the result. If, upon the blue and yellow surfaces, a third surface, colored in red, be placed, a resultant picture in red, yellow, blue and all the various combinations of these three colors, may be produced, as desired, the location of each color on its respective surface determining the coloring of the various parts of the complete picture. This will be clearly understood on reference to the drawings, where the hatched lines in Fig. 1 represent that portion of a glass or other transparent surface, colored blue, Fig. 2, red, and, Fig. 3, yellow. When these three panes are placed together, as shown in section in Fig. 5, the various parts of the picture would cover each other, as indicated by the several angles of the hatching lines in Fig. 4, and the prime or constituent colors and their combinations would produce the final result of one complete picture.

These glass pictures are characterized by the greatest transparency and brilliancy of color, and, as the plates consist of glass stained in the natural colors only, the greatest durability or permanency of color is insured.

By discarding the leading, common to the old process of glass-staining, the maximum distinctness of outline and the greatest range of possible representations are permitted.

Having thus fully described my invention, what I claim, and desire to secure by Letters Patent, is—

1. The process of producing colored pictures, which consists in applying to separate surfaces the various colors which make up the complete picture, each surface bearing but one color, then stacking the various surfaces together, the location of each color on its respective surface being determined by the desired position of such color or some combination of it in the complete picture.

2. The process of producing colored pictures, which consists in applying to separate transparent surfaces the various colors which make up the complete picture, each surface bearing but one color, then stacking the various transparent surfaces together, the location of each color on its respective surface being determined by the desired position of such color or some combination of it in the complete picture.

3. The process of producing colored pictures, which consists in applying to separate panes of glass the various colors which make up the complete picture, each surface bearing but one color, then placing the various panes one upon the other, the location of each color on its respective pane being determined by the desired position of such color or some combination of it in the complete picture.

4. The process of producing colored pictures, which consists in applying to separate surfaces the various colors which make up the complete picture, each surface bearing but one color graduated in tone as desired, then stacking the various surfaces together, the location of each color and its graduations on its respective surface being determined by the required position of such color or some combination or shade of it in the complete picture.

5. The process of producing colored pictures, which consists in applying to separate transparent surfaces the various colors which make up the complete picture, each surface bearing but one color graduated in tone as desired, then stacking the various transparent surfaces together, the location of each color and its graduations on its respective surface being determined by the required position of such color or some combination or shade of it in the complete picture.

6. The process of producing colored pictures, which consists in applying to separate panes of glass the various colors which make up the complete picture, each pane bearing but one color graduated in tone as desired, then stacking the various panes one upon the other, the location of each color and its graduations on its respective surface being determined by the required position of such color or some combination or shade of it in the complete picture.

7. As an article of manufacture, a picture consisting of several separate sheets stacked together, one surface of each sheet bearing one color, the location of each color on its respective surface being determined by the desired position of such color or some combination of it in the complete picture.

8. As an article of manufacture, a picture consisting of several separate sheets stacked together, one surface of each sheet bearing one color graduated in tone, as desired, the location of each color and its graduations on its respective surface being determined by the desired position of such color or some combination or shade of it in the complete picture.

9. As an article of manufacture, a picture consisting of several panes of glass stacked together, each pane bearing one color, the location of each color on its respective pane being determined by the desired position of such color or some combination of it in the complete picture.

10. As an article of manufacture, a picture consisting of several panes of glass stacked together, each pane bearing one color graduated in tone, as desired, the location of each color and its graduations on its respective pane being determined by the desired position of such color or some combination or shade of it in the complete picture.

In testimony that I claim the foregoing as my invention I have signed my name in presence of two subscribing witnesses.

OTTO DILLMANN.

Witnesses:
 ALBERT WEICKMANN,
 C. MAYER.